United States Patent [19]

Dundas et al.

[11] Patent Number: 5,037,684
[45] Date of Patent: Aug. 6, 1991

[54] BLOW MOLDED ASEPTIC BOTTLE AND METHOD

[75] Inventors: Dennis L. Dundas, Dover; Eugene L. Moore, York, both of Pa.

[73] Assignee: Graham Engineering Corporation, York, Pa.

[21] Appl. No.: 382,546

[22] Filed: Jul. 19, 1989

[51] Int. Cl.⁵ ............................................. B65D 23/00
[52] U.S. Cl. .................... 428/36.92; 215/1 C; 428/542.8
[58] Field of Search .................. 428/36.92, 542.8; 215/1 C

[56] References Cited

U.S. PATENT DOCUMENTS

| | | | |
|---|---|---|---|
| 3,089,185 | 5/1963 | Di Settembrini | 18/5 |
| 3,356,244 | 12/1967 | Witchell | 215/32 |
| 3,369,690 | 2/1968 | Hayes | 215/100 |
| 3,423,495 | 1/1969 | Bachner | 264/96 |
| 3,464,085 | 9/1969 | Burkett et al. | 18/5 |
| 3,717,430 | 2/1973 | Hansen | 425/392 |
| 3,765,144 | 10/1973 | Schiesser | 53/39 |
| 3,814,783 | 6/1974 | Dardaine et al. | 264/89 |
| 3,961,846 | 1/1985 | Berry | 425/305 |
| 4,026,982 | 5/1977 | Dardaine et al. | 264/89 |
| 4,052,986 | 10/1977 | Scaife | 128/260 |
| 4,150,115 | 4/1985 | Gokcen et al. | 264/515 |
| 4,178,976 | 12/1979 | Weiler et al. | 150/0.5 |
| 4,266,927 | 5/1981 | Gilbert et al. | 425/526 |
| 4,401,423 | 8/1983 | Bellehache et al. | 425/210 |
| 4,425,090 | 1/1984 | Hansen | 425/503 |
| 4,540,542 | 9/1985 | Weiler | 264/524 |
| 4,574,965 | 3/1986 | Meierhoefer | 215/32 |
| 4,617,077 | 10/1986 | Giese et al. | 156/245 |
| 4,671,763 | 6/1987 | Weiler | 425/525 |
| 4,707,966 | 11/1987 | Weiler et al. | 53/410 |
| 4,790,117 | 12/1988 | Hansen | 53/410 |
| 4,904,550 | 2/1990 | Kano et al. | 429/185 |

FOREIGN PATENT DOCUMENTS 1566102 8/1969 France .
2042538 4/1971 France .
1296612 11/1972 United Kingdom .

Primary Examiner—James J. Seidleck
Attorney, Agent, or Firm—Thomas Hooker

[57] ABSTRACT

A parison is blow molded to form a sealed aseptic bottle for subsequent opening and filling. The pressure of the gas in the interior of the bottle when sealed is subatmospheric to prevent distortion of the bottle.

40 Claims, 2 Drawing Sheets

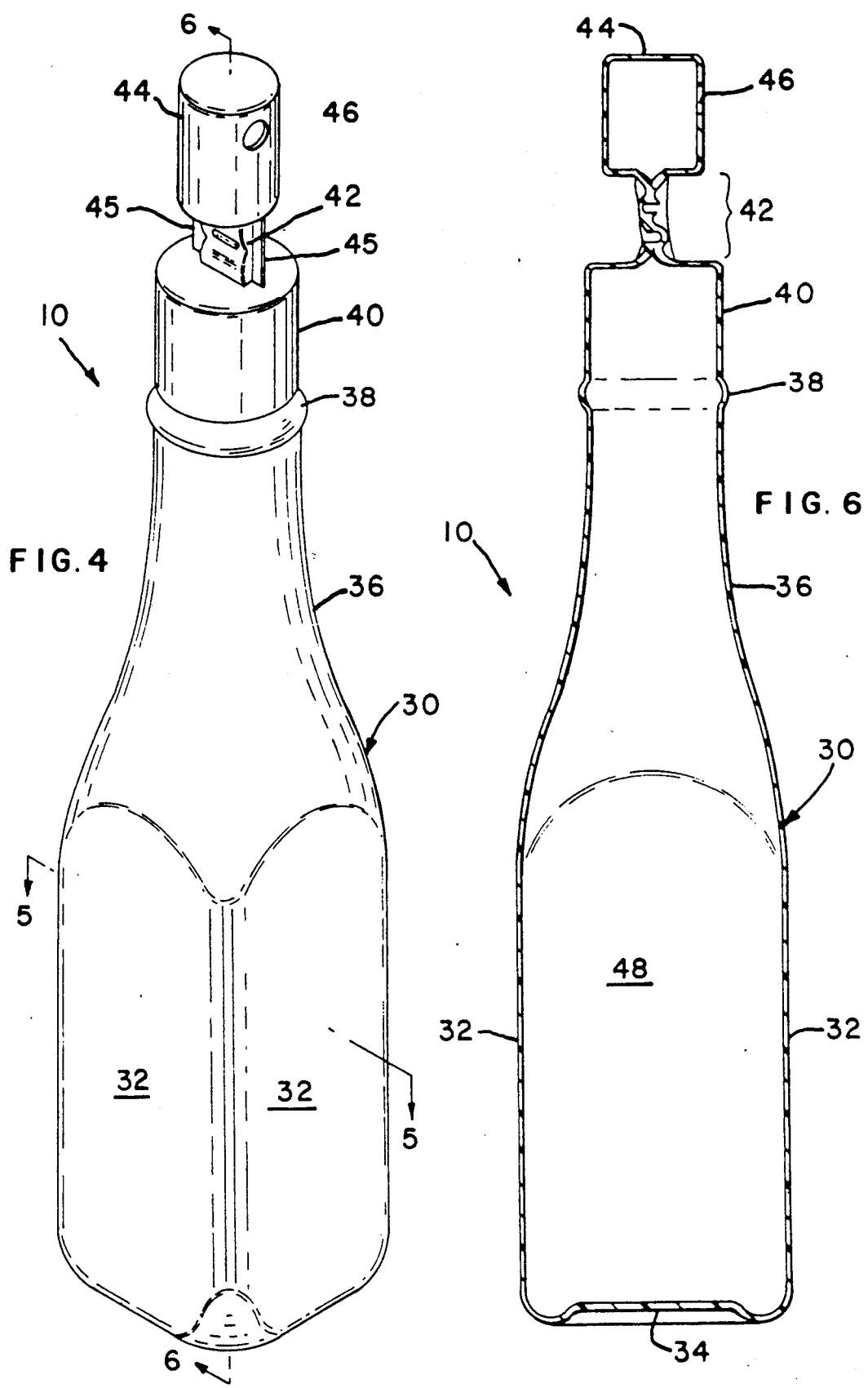

BLOW MOLDED ASEPTIC BOTTLE AND METHOD

FIELD OF THE INVENTION

The field of the invention is blow molding sealed aseptic bottles, methods for blow molding sealed aseptic bottles and apparatus for blow molding such bottles.

The sealed bottles are manufactured and may be stored for a period before being filled and resealed, conventionally by applying a cap or other closure, without destroying sterility. There is no need to sterilize the bottles before filling. The bottles may be filled with food products such as milk, juices and the like, medical fluids such as saline solution and blood, or any other contents requiring a sterile container.

DESCRIPTION OF THE PRIOR ART

Conventional aseptic bottles are blow molded from parisons using sterile air, vented and then sealed in the mold halves at atmospheric pressure.

It is also conventional to blow mold bottles, fill the freshly molded bottles while in the mold and then seal the filled bottles to assure the sterility of the bottle and contents.

SUMMARY OF THE INVENTION

The invention relates to a blow molded sealed aseptic bottle having walls susceptible to deformation after molding. The bottle is manufactured from a parison using a continuous or rotary blow molding process operating at a rapid rate with a very short residence time in the mold.

Deformation of the bottle is prevented by blow molding the parison confined in a mold cavity using high pressure sterile blow air, maintaining the pressure of the blow air in the bottle in the mold for a sufficient time to cool and set the outer or skin plastic in contact with the mold, venting the blow air out of the bottle so that the residual air in the bottle is expansion-cooled, reducing the pressure of the cooled residual blow air in the bottle below atmospheric pressure and then sealing the bottle at subatmospheric pressure. After sealing the mold opens, the bottle is ejected and the residual heat in the plastic slowly dissipates as the plastic cools to ambient temperature and stabilizes. The residual heat warms the cool negative pressure air sealed in the bottle to increase the interior pressure to atmospheric pressure or very near atmospheric pressure and prevent pressure differentials across the walls of the bottle sufficient to deform the bottle during stabilization.

The molds used for molding and cooling the aseptic bottles are sufficiently cooled to maintain a low temperature capable of rapidly cooling and setting the skin plastic in the bottle while the bottle is in the mold. This rapid cooling capability together with the reduction of the pressure of the expansion cooled residual blow air sealed in the bottle permits extremely rapid and efficient manufacture of the aseptic bottles with minimum residence in the mold after blowing. For instance, aseptic bottles may be manufactured on a vertical rotary blow molding machine carrying a total of 14 circumferentially spaced molds and rotating at a rate of approximately 6.5 revolutions per minute. The machine produces aseptic bottles at a very high production rate of about 91 bottles per minute.

Other objects and features of the invention will become apparent as the description proceeds, especially when taken in conjunction with the accompanying drawings illustrating the invention, of which there are three sheets and one embodiment.

DESCRIPTION OF THE DRAWINGS

FIG. 3 is an enlarged view of a portion of FIG. 3 showing the seal closing the molded bottle;

FIG. 4 is a perspective view of the molded, sealed and deflashed bottle; and

FIGS. 5 and 6 are sectional views of the bottle taken along lines 5—5 and 6—6 of FIG. 4.

DESCRIPTION OF THE PREFERRED EMBODIMENT

Figures 1, 2:
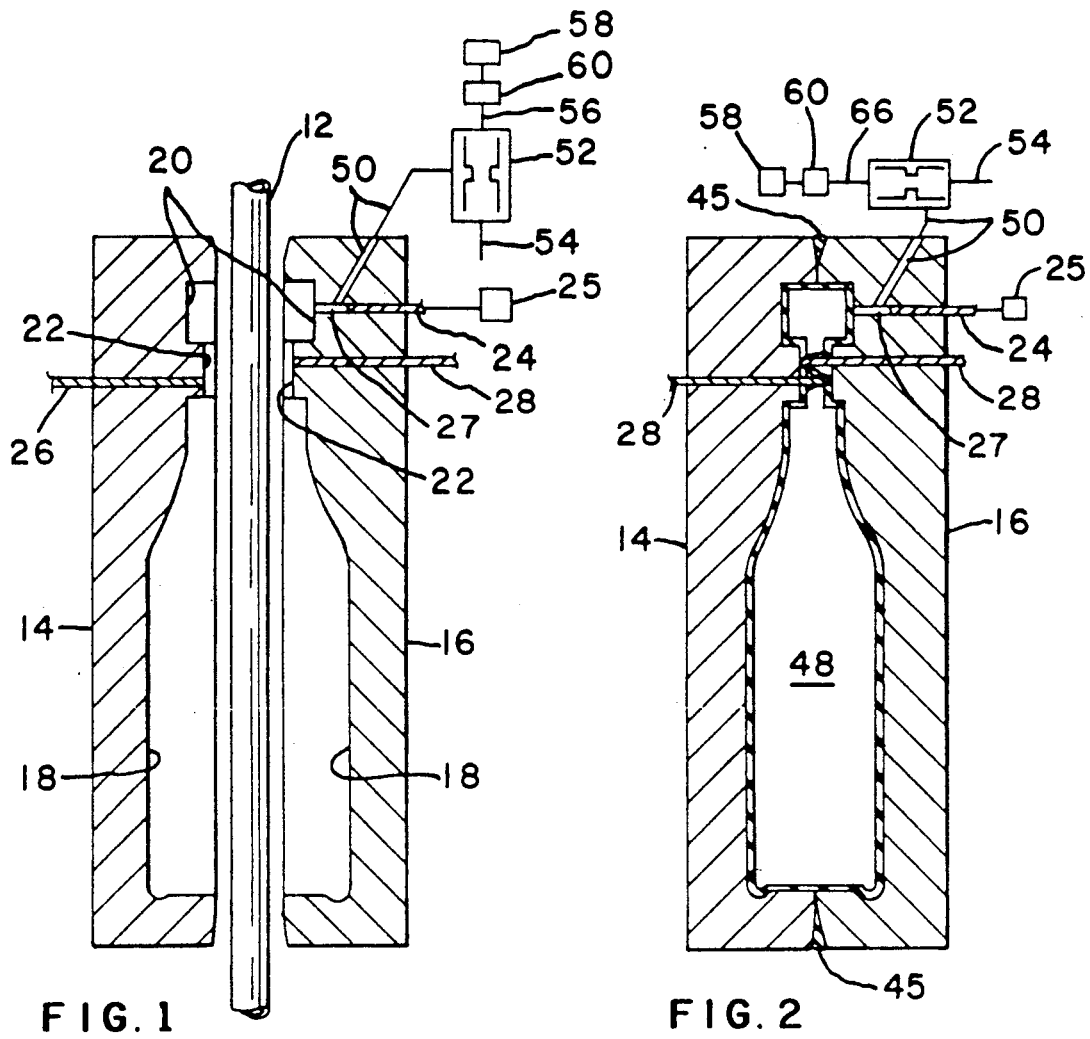
FIGS. 1 and 2 are cross sectional views taken through a pair of mold halves illustrating blow molding of a parison to make a sealed aseptic bottle.

Sealed aseptic plastic bottle 10 is blow molded from an extruded molten parison 12 using a pair of complementary mold halves 14 and 16 as shown in FIGS. 1 and 2. The bottle 10 is made from high density polyethylene resin extruded in parison 12, although other resins, or even coextruded resins, may be used as desired.

The mold halves include bottle recesses 18, blow dome recesses 20 and shallow seal neck recesses 22 connecting recesses 18 and 20. When the molds are closed as in FIG. 2, the recesses form joined blow dome, seal neck and bottle cavities. The diameter of the extruded parison 12 may be greater than the diameter of the parison illustrated and may be greater than the widths of the recesses at the top of the mold. When extruded, the high density polyethylene parison 12 has a high temperature in the range of about 400 to 450 degrees F.

Figures 3, 5:
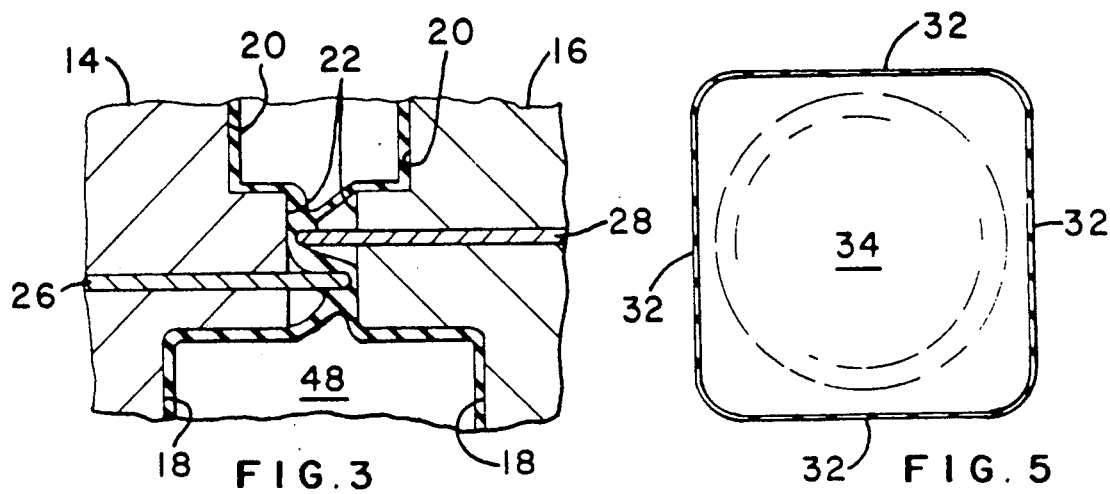

Mold half 16 carries a blow needle 24 which may be extended into the blow dome cavity. The needle is connected to a source of sterile blow air 25 through an appropriate valving system. A drive moves the needle back and forth between a retracted position shown in FIG. 1 and an extended position in which the needle tip is located within the blow cavity dome. Each mold half 14, 16 carries a sealing blade 26, 28 movable into the seal neck cavity 22 by drive means, not illustrated, for closing the seal neck of the blown bottle as shown in FIG. 3. Mold halves 14 and 16 are provided with water cooling manifolds (not illustrated). Water at a temperature of about 40 to 50 degrees F. circulates through the manifolds and maintains the mold halves at a cool temperature.

Needle 24 is fitted in bore 27 in mold half 16 as illustrated. Exhaust passage 50 intersects the bore a short distance outwardly from the adjacent blow dome recess 20. When retracted, the tip of the needle 24 is withdrawn past the passage 50 so that pressurized blow air is vented directly out to the needle bore 27 and passage 50. During venting, the needle valving system is closed to prevent vent air from flowing through the needle.

Passage 50 is connected to the low pressure port of high flow rate, low pressure venturi 52. Exhaust line 54 is connected to the venturi exhaust port and is vented to atmosphere. Line 56 connects the venturi inlet port to pressurized air source 58 through valve 60. See FIGS. 1 and 2. Valve 60 is opened to flow pressurized air through the venturi at a high flow rate and out the exhaust line to atmosphere. The low pressure port and main passages in the venturi have a relatively large cross sectional areas and do not restrict the exhaust flow of blow air through bore 27 and passage 50. The venturi rapidly reduces the pressure in the mold to about negative 2 psi.

Plastic bottle 10 includes a generally square body 30 having four thin flat sidewalls 32 extending between bottom 34 and a thin shoulder portion 36. The bottle may be made of high density polyethylene or other suitable resins or combination of resins. The shoulder portion extends upwardly from the sidewalls 32 to a thin annular bead 38 and thin cylindrical bottle neck 40 at the top of the bottle. The neck may be provided with threads or other closure structure engageable with a cap or other closure to seal the bottle when opened and filled. A welded, redundant seal 42 extends between bottle top 40 and blow dome 44. Blow needle opening 46 extends through the side of the blow dome.

The thin bottle sidewalls are about 0.016 inch thick and are about 6 inches high and 4 inches wide. The flat sidewalls may include ⅛ inch horizontal corrugations (not illustrated) conforming to horizontal corrugations in the mold halves (not illustrated). Bottom 34 is relatively thick having a thickness of approximately 0.030 to 0.040 inch or a greater thickness, depending upon the requirements of the particular bottle. Thick flash 45 is attached to the bottle which ejected from mold halves 14 and 16. The flash has been partially trimmed away in FIGS. 4–6.

The parison is extruded at a high temperature of about 400 to 450 degrees F. with the plastic resin in an easily flowable, molten or near molten state. During manufacture of the bottle the plastic in the parison cools from the extrusion temperature down through a set temperature of about 120 to 140 degrees F. and ultimately to ambient temperature. When cooled to the set temperature the plastic becomes hard and is no longer soft and flowable. The molecular structure of the hardened, set plastic stabilizes as it cools down from the set temperature to ambient temperature. During stabilization physical deformation of the bottle from the molded shape can be permanently locked into the fully stable plastic resulting in a deformed and reject bottle. During stabilization the plastic thermally contracts, stress relaxes and crystallizes.

The plastic used in manufacturing bottles is a very good insulator and takes a long time to fully cool to ambient temperature. At the time the bottle is ejected from the cooled mold the outer plastic skin has been cooled below the set temperature and is hard. The plastic located inwardly of the skin is hotter than the skin plastic and in thick bottom 34 is above set temperature and soft. In order to fully cool the bottle it is necessary to remove all the residual heat in the plastic above ambient temperature.

Initial cooling and removal of the residual heat from the plastic in the ejected bottle occurs relatively rapidly with about 85 to 90 percent of the residual heat removed from the plastic during the first hour after ejection. A total of approximately 48 hours of cooling is required to remove all residual heat from the plastic so that all of the plastic in the bottle is at ambient temperature and fully stabilized. A longer time is required to remove residual heat from the thick bottom of the bottle than is required to remove the residual heat from the thinwall sections of the bottle.

Stabilization occurs during cooling of the plastic in the sealed bottle below the set temperature. In order to assure that the shape of the bottle, when fully cooled, conforms to the molded shape it is necessary to prevent physical deformation of the hard plastic during the entire cooling cycle. Deformation such as ballooning or flexing of the flat sidewalls (with or without corrugations) occurs when the temperature of the air sealed in the bottle is increased by release of residual heat from the plastic. The heated air expands, increases internal pressure and balloons the walls of the bottle outwardly. Subsequent stabilization of the plastic in the ballooned sidewalls locks in the deformed shape and ruins the bottle. The bottle must be sealed to maintain sterility. It is not possible to equalize pressure by puncturing or opening the bottle during cooling.

The shape of the molded, sealed aseptic bottle is maintained through full cooling to ambient by reducing the pressure of the cool air in the bottle below atmospheric pressure when the bottle is sealed. Residual heat in the plastic in the ejected bottle warms and expands the cooled, subatmospheric air in the interior of the bottle to maintain an interior pressure sufficiently equal to outside atmospheric pressure to prevent bulging or ballooning of the bottle during cooling. In bottle 10, it is necessary to maintain the interior bottle pressure to within about ½ pound per square inch of atmospheric pressure in order to prevent pressure ballooning of the thin, flat corrugated bottle sidewalls.

The plastic in the bottle shrinks during cooling and as a result the interior volume of the bottle decreases during the first 5 to 10 hours of cooling. The decrease in volume increases interior pressure and the risk of ballooning. The negative atmospheric pressure of the air in the bottle, when sealed in the mold, is adjusted to compensate for the future decrease in volume and consequent increase in pressure because of bottle shrinkage. Unless compensated for, shrinkage alone can outwardly balloon thin bottle sidewalls with the result that these walls stabilize in the ballooned, deformed shape and ruin the bottle.

The step-by-step molding of bottle 10 will now be described.

The hot, sterile parison 12 is extruded between the open mold halves as shown in FIG. 1. The mold halves are closed thereby capturing a portion of the parison within the bottle, seal neck and blow dome cavities. Upon closing of the mold halves the edges of the recesses intersect the parison and form flash 45 integral with the captured parison outside of the mold cavities. The flash at the top and bottom of the bottle is shown in FIG. 2.

After the mold halves are closed the retracted blow pin 24 is extended into the blow dome cavity formed by recesses 20 and punctures the hollow confined hot parison. Sterile blow air at a pressure of approximately 80 lbs. per square inch is flowed through the needle and into the parison to inflate the parison against the blow dome, seal neck and bottle cavities to form a body having a single interior volume filled with pressurized, sterile blow air. The blow air holds the plastic in intimate contact with the walls of the mold halves to cool the plastic. The entire outer surface or skin of the bottle is cooled below the set temperature and hardens. Some skin portions may be cooled below ambient temperature. The plastic inside the skin is hotter than the skin. The inner plastic in the thinwall portions of the bottle may be set. The inner plastic in the thick bottom remains at a temperature above the set temperature and is soft.

During cooling of the bottle plastic in the mold the blow air is heated to about 200 to 250 degrees F. Following cooling and setting of the bottle skin the blow needle 24 is withdrawn to allow the confined pressurized and hot blow air to vent quickly to atmosphere through relatively large cross section bore 27, exhaust passage 50, the low restriction passages of venturi 52 and exhaust line 54. At the same time valve 60 is opened and a large volume of pressurized air flows through the venturi 52. The air may be at an initial pressure of about 80 psi. This flow does not restrict venting of the pressurized blow air. The rapid flow of pressurized blow air out of the bottle interior 48 reduces the pressure in the interior of the bottle thereby expanding and cooling the remaining blow air in the bottle to a low temperature believed to be below ambient temperature.

Venting of the pressurized blow air in bottle 48 reduces the pressure in the bottle interior to atmospheric pressure. Immediately after the pressure in the bottle interior 48 falls to atmospheric pressure venturi 52 quickly draws air from interior 48 through lines 27 and 50, into the venturi and out line 54 to atmosphere, reducing the pressure in the bottle interior below atmospheric pressure. The venturi rapidly reduces the pressure in bottle interior 48 to a pressure of about negative 2 psi.

The venturi permits free pressure venting of the blow air and immediately further reduces the pressure of the bottle when the pressure of the remaining air has been reduced to atmospheric pressure. Its operation is automatic and does not require sophisticated controls, sensors or valves. If desired, the amount of pressure reduction can be varied by varying the pressure of the air supplied to the venturi from source 58.

With the interior of the bottle at the desired negative pressure the drivers for sealing blades 26 and 28 are actuated to extend the blades into the neck seal cavity formed by surfaces 22 thereby engaging the opposite sides of the confined hollow plastic in the recess and forcing the respective sides across the cavity and into welding engagement with the opposite sides to join the plastic together and form a seal closing the sterile, negative pressure bottle interior 48. At the same time the valve 60 is closed to cut off the flow of air through the venturi.

The driving forces required for moving blades 26 and 28 and forming the desired seals is relatively high. Mold halves 14 and 16 may carry insulating inserts at recesses 22 in order to prevent the plastic in the seal neck cavity from being cooled below a welding temperature. Preferably, extension of the blades 26 and 28 not only welds together the layers of plastic captured between the blade ends and the walls of recesses 22 but also welds together the plastic layers extending diagonally between the tip ends of the two blades to form an effective triple redundant seal closing off bottle interior 48. The interior of sealed bottle 10 is sterile. This is assured by the high temperature of the parison when extruded and captured by the mold halves and the use of sterile blow air.

After cooling and setting of the skin of the sealed aseptic bottle, the mold halves 14 and 16 are opened and the bottle is ejected from the blow molding machine. At the time the bottle is ejected, the inside of the thick bottom 34 has cooled but is still above the set temperature and is soft and pressure deformable. The temperature of the inside of the bottom is about 180 to 200 degrees F. The skin of the bottle has been cooled to about 60 degrees F, nearly the mold temperature. In order to maximize production, the mold opens and the bottle is ejected as soon as the bottle skin hardens and the bottle is rigid. When ejected, the subatmospheric pressure in the bottle bows the thin sidewalls inwardly. These walls quickly return to the molded flat shape as the confined air warms.

As the ejected bottle cools to ambient temperature and residual heat in the plastic is given off, the outer plastic, including the skin warms, the hot inner plastic cools and the cool air in the bottle warms and expands, increasing and maintaining the pressure in the bottle to substantially atmospheric pressure. The inner bottom plastic sets. Maintenance of substantial atmospheric pressure within the bottle, plus or minus about ½ psi prevents ballooning of the bottle. The bottle walls, including flat and easily ballooned sidewalls 32, do not bulge. A greater pressure differential across the wall of the bottle is capable of ballooning the bottle during stabilization of the plastic with resultant permanent deformation of the bottle as previously described.

The shape of the final cooled bottle depends upon the temperature of the atmosphere surrounding the bottle as the plastic slowly cools after ejection from the mold halves. The negative pressure in the bottle when sealed is adjusted to assure proper geometry, without ballooning the sidewalls, when the bottle cools in an environment having a predetermined ambient temperature, say 70 degrees F. If the bottle is cooled in a higher temperature environment, say 100 degree F., then the pressure in the interior would be increased by approximately 4 percent and the sidewalls would balloon. Ballooning of the sidewalls before full stabilization sets the sidewalls in a permanent and unacceptable ballooned shape. The bottle will not return to the desired flat sidewall shape when opened. This problem can be avoided by cooling the bottles in a controlled temperature environment.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. An intermediate container including a body blow molded from a plastic resin having a set temperature, the body having a hollow, sealed interior, the skin of the body having a temperature below the set temperature and being hard, an interior portion of the body having a temperature above the set temperature and being soft, and a gas confined within the interior of the sealed body at a subatmospheric pressure.

2. A container as in claim 1 including a thick bottom and wherein the interior portion is located on the bottom.

3. A container as in claim 2 including a thin pressure deformable and inwardly bowed sidewall.

4. An article as in claim 2 wherein said body is rectangular with four thin inwardly bowed corrugated sidewalls, said sidewall having been molded essentially flat and wherein the bottom is approximately twice as thick as the sidewalls.

5. A container as in claim 1 including a thinwall at a temperature below the set temperature and being hard, said wall being molding generally flat and being inwardly bowed.

6. A container in claim 1 wherein the gas and the interior of the body are sterile.

7. A container as in claim 1 wherein said body comprises a bottle with a bottom and a sidewall, the bottom of the bottle being thicker than the sidewall, said interior portion being located at the bottom of the bottle.

8. A container as in claim 7 wherein said sidewall is inwardly bowed.

9. A container as in claim 1 wherein the temperature of the gas confined within the interior of the body is lower than the temperature of the body.

10. A container as in claim 9 wherein the temperature of the gas is less than the temperature of the atmosphere outside of the article.

11. An intermediate container including a hollow sealed and imperforate body blow molded from a plastic resin and having a hard skin and a pressure deformable wall, the body completely surrounding and defining the interior of the container and a subatmospheric gas confined within the interior of the body.

12. A container as in claim 11 wherein the gas is cooler than the body.

13. A container as in claim 11 wherein said wall is bowed inwardly.

14. A container as in claim 11 including a thickwall, the thickwall including a mass of soft resin on the interior of the body.

15. A container as in claim 14 wherein said body comprises a bottle, said mass being located at the bottom of the bottle.

16. A bottle as in claim 15 wherein the pressure deformable wall is inwardly bowed.

17. A bottle as in claim 16 including a seal located adjacent the top of the bottle.

18. A bottle as in claim 17 including four thin corrugated and inwardly bowed molded sidewalls.

19. A bottle as in claim 17 wherein the interior pressure is about negative 2 psi.

20. A bottle as in claim 17 wherein the pressure of the subatmospheric gas is such that upon cooling of the bottle and gas to ambient temperature the interior pressure of the gas confined within the interior of the bottle increases to a pressure substantially equal to atmospheric pressure.

21. A bottle as in claim 20 wherein the pressure of the gas in the bottle following cooling of the bottle and heating of the gas to atmospheric temperature is within approximately 0.2 psi of atmospheric pressure.

22. A bottle as in claim 21 wherein the set temperature of the plastic resin is about 120 to 140 degrees F.

23. An article as in claim 11 wherein the gas and the interior of the body are sterile.

24. A sealed container comprising a blow molded hollow and imperforate plastic body sealed closed during molding to define a hollow interior, the interior of the body being sterile, a sterile gas confined within the interior volume of the body during molding, said gas being at ambient temperature and having a pressure substantially equal to atmospheric pressure, the plastic in the body being fully stabilized and at ambient temperature, the body including an unbowed thin wall pressure deformable by small differences between ambient pressure outside of the thin wall and the pressure of the gas within the interior volume of the body on the inside side of the thin wall, and a thick wall not deformable by small differences between ambient pressure outside the thick wall and the pressure of the gas within the interior of the body on the inside of the thick wall.

25. A container as in claim 24 wherein the body forms a bottle and the thin wall forms one side of the bottle and the thick wall forms the bottom of the bottle.

26. A container as in claim 24 wherein the body forms a bottle and the thin wall forms the side of the bottle and the thick wall forms the bottom of the bottle.

27. A container as in claim 25 wherein the thin wall is corrugated and has a thickness of about 0.016 inch.

28. A body as in claim 24 wherein said thin wall is essentially planar.

29. A bottle as in claim 25 including corrugations in the thin wall.

30. A container as in claim 24 wherein the pressure of the gas within the interior of the body is within about 0.2 psi of ambient pressure.

31. A container as in claim 24 wherein said thin wall has a thickness of about 0.016 inch.

32. A container as in claim 31 wherein said thick wall has a thickness of from about 0.030 inch to 0.040 inch.

33. A container as in claim 24 wherein said thick wall is approximately twice as thick as said thin wall.

34. A container as in claim 33 including four flat thin wall sides arranged around a circumference of the body.

35. A container as in claim 34 including a bottom at one end of said thin walls.

36. A container comprising a hollow imperforate body blow molded from plastic resin and conforming to the shape of a mold, the body including a thin unbowed wall deformable by slight pressure differentials on opposite sides of the wall, the interior of the body being sterile, and a sterile gas sealed within the interior of the body while within the mold, the plastic body being at ambient temperature and stable, the gas being at ambient temperature and having a pressure substantially equal to ambient pressure.

37. A container as in claim 36 wherein said wall is flat.

38. A container as in claim 37 including a thick bottom, said wall extending away from the bottom.

39. A container as in claim 36 including a thick bottom, a narrow neck and four flat, thin sidewalls located between the bottom and neck.

40. A container as in claim 39 wherein said sidewalls are corrugated.

* * * * *